Patented Dec. 12, 1922.

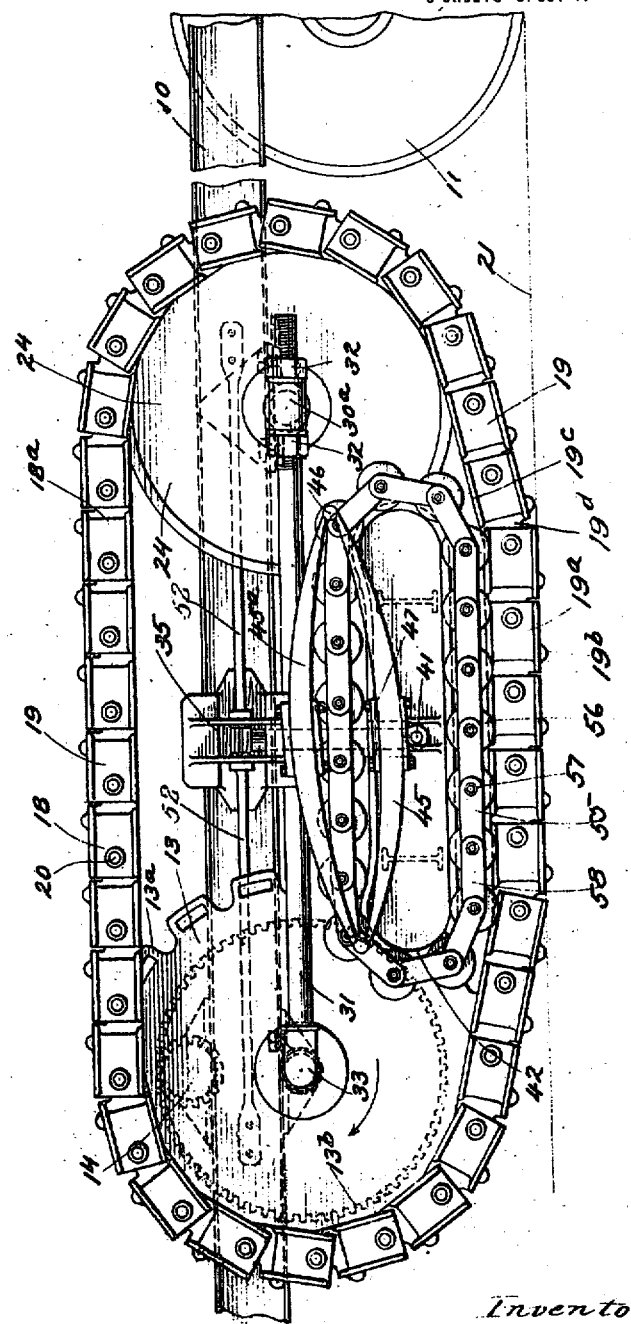

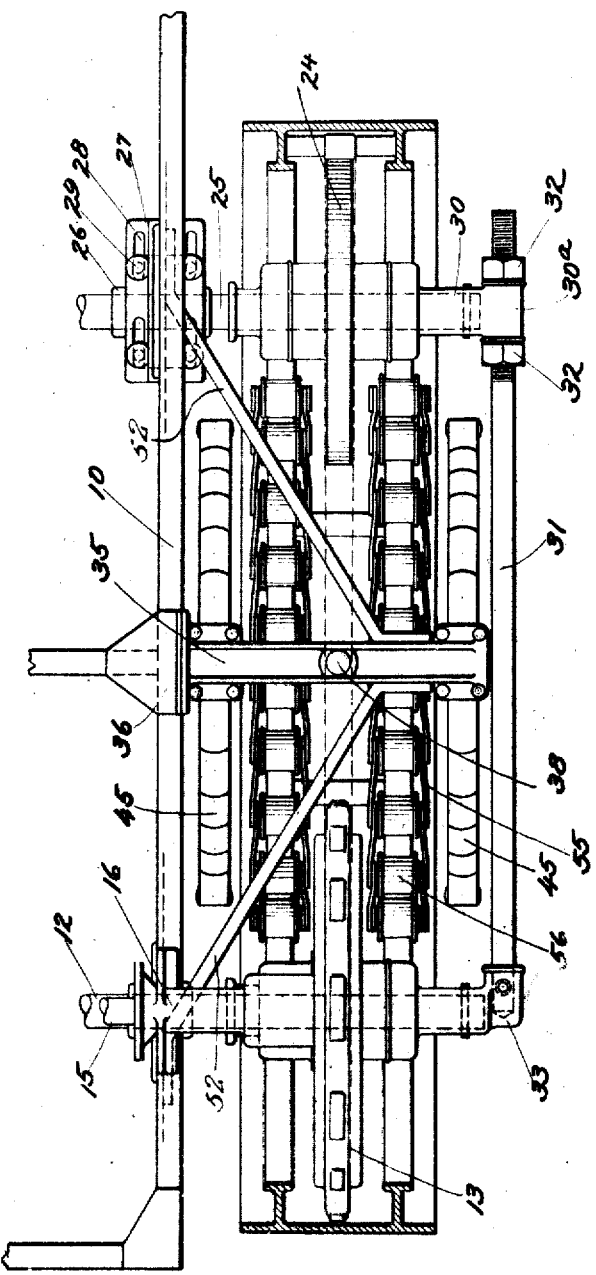

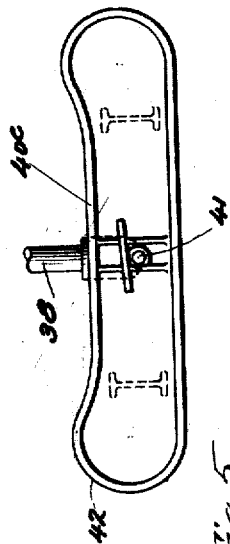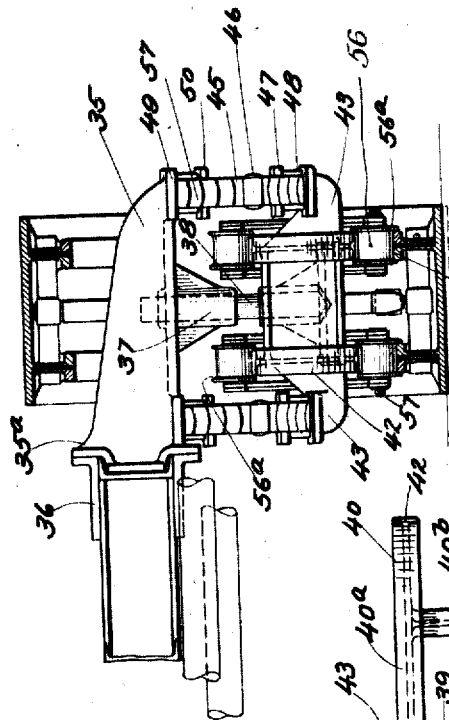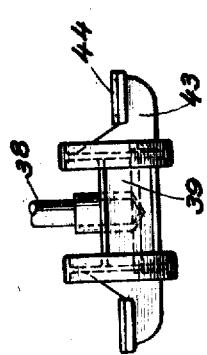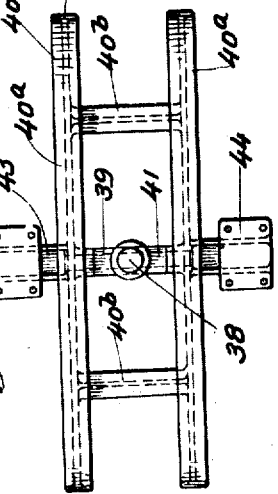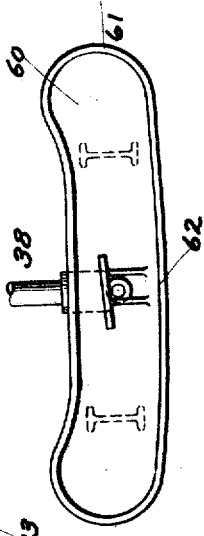

1,438,228

UNITED STATES PATENT OFFICE.

GEORGE LAWRENCE ERTZ, OF NEW YORK, N. Y.

TRACTOR MECHANISM.

Application filed October 16, 1917. Serial No. 196,844.

*To all whom it may concern:*

Be it known that I, GEORGE L. ERTZ, a citizen of the United States, residing at New York, in the county of New York and State of New York, have invented certain new and useful Improvements in Tractor Mechanism, of which the following is a specification.

This invention relates to tractor mechanism, and particularly to the driving mechanism of a tractor in which a flexible tread or chain coacts with the surface of the ground and is continuously laid down and picked up by the traction wheels when in operation.

The principal object of the invention is to provide an improved form of flexible tread construction in which the weight of the tractor is carried by the flexible tread independently of the traction wheels. A further object is to provide means for resiliently mounting the tractor on the flexible tread independently of the traction wheels. A further feature is the provision of a resiliently mounted supporting device carried by the frame of the tractor and comprising a movable element coacting with the flexible tread. A further feature is the provision of a flexible tread which approximates a large traction wheel. Other objects relate to various features of construction and arrangement which will appear more fully hereinafter.

The nature of the invention will be understood from the following specification, taken in connection with the accompanying drawings, in which one embodiment of the invention is illustrated.

In the drawings—

Figure 1 shows a partial side elevation of a tractor, illustrating my improved tread.

Fig. 2 shows a top plan view of the caterpillar tread and the driving mechanism therefor.

Fig. 3 shows an end elevation of the supplementary or tread frame.

Fig. 4 shows a side elevation of the tread frame.

Fig. 5 shows a transverse sectional view through the tread mechanism illustrating a portion thereof in end elevation.

Fig. 6 shows a top plan view of the tread frame; and

Fig. 7 shows a side elevation of a modified form of tread.

Since the present invention is limited to the flexible tread mechanism, the entire tractor has not been shown, but only such parts thereof as are necessary for explaining the application of the present invention. In the drawings the frame of the tractor is designated by the numeral 10, and the forward wheel by the numeral 11. The rear axle 12 is fixedly mounted with respect to the frame of the machine, and each projecting end thereof has journalled thereon a rear traction wheel 13 having gear teeth 13ᵃ. This traction wheel is provided with an inner annular gear 13ᵇ, which meshes with a driving pinion 14 fixed on the driving shaft 15, journalled in a suitable bearing 16 carried by the frame and driven by the engine of the tractor through suitable driving connections, not shown. The traction wheel is adapted to rotate in the direction indicated by the arrow, and the teeth thereof mesh with the flexible tread or chain 18, comprising a plurality of links 19 which are pivotally connected by means of pins 20. The links may be of any suitable construction, but in the embodiment shown each link has a tread plate 19ᵃ having projections 19ᵇ on the outer surface thereof, in order to increase the traction. Parallel flanges 19ᵈ extend upwardly or inwardly from the plate 19ᵃ, and parts thereof project beyond one end of each plate and between the corresponding flanges of the adjacent link, the overlapping flanges being pivotally engaged by the pins 20. The teeth of the traction wheel 13 are adapted to enter between the pins 20 of the flexible tread.

The forward portion of the endless tread 18 is mounted on the forward or idler traction wheel 24. The forward traction wheel 24 is journalled by means of suitable bearings on the forward axle 25 carried by a plate 26, which is adjustable with respect to the plate 27 mounted on the side frame 10. This adjustment is effected by means of slots 28 in the plate 27, and bolts 29 passing through the plate 26 and slots 28. The outer end of the axle 25 engages a bracket 30, having a sleeve 30ᵃ at its outer end engaged by the rod 31, which is secured in position with respect to the sleeve by the lock nuts 32 engaging the threaded portion thereof. The rear end of the rod 31 is connected to a bracket 33, mounted on the projecting end of the rear axle 12. The outer ends of the two axles are thus connected together, and the forward axle may be adjusted with respect to the rear axle in order to regulate the tension of the flexible tread by adjusting the lock nuts 32 on the rod 31 and by varying the position of the plate 26 with respect to the supporting plate 27 mounted on the frame. As the rear traction wheel is driven by the driving shaft 15 the flexible tread will be moved forwardly, and will be laid down continuously by the forward traction wheel in the path of travel of the rear traction wheel by which the tread is continuously picked up.

Instead of supporting the weight of the machine directly on the axles 12 and 25, I have provided an intermediate supporting mechanism mounted between the rear traction wheel 13 and the forward traction wheel 24, and adapted to engage the intermediate portion of the flexible tread and maintain a portion thereof in a plane below the lowermost portions of the peripheries of the traction wheels. For this purpose a supporting arm 35 is mounted on the side frame member 10, and secured thereto by means of flanges 35ᵃ and angle bars 36, and the intermediate portion of this arm carries a downwardly projecting sleeve 37 slidably engaged by a rod or plunger 38, the lower end of which is mounted in a bracket 39 pivoted between the side frame members 40ᵃ of the tread frame 40 by means of a pin 41. The tread frame comprises the two parallel side frame members 40ᵃ, the edges of which are flanged to form tracks 42 for the roller mechanism to be hereinafter described, and these frame members are connected by the transverse frame members 40ᵇ. The upper walls of the frame members 40ᵃ are hollowed out between their ends, as shown at 40ᶜ. The arms 43 project from opposite sides of the central portion of the tread frame, and carry plates 44 which form seats for the springs 45, of elliptical form, comprising the complementary parts 45ᵃ pivotally connected at the points 46. The lower portion 45ᵃ of each spring is clamped to its spring seat 44 by means of a plate 47 and bolt 48, and the upper portion 45ᵃ of each spring is connected to a corresponding spring seat formed by a flange 49 formed on the under side of the supporting arm 35. The flanges 49 are located directly above the corresponding plates 44, and the upper portions of the springs are secured thereto by means of plates 50 and bolts 51. The tread frame is thus connected to the arm 35 through the springs 45, and these springs are so designed as to maintain the central sleeve 37 a considerable distance above the bracket 39, by which the central guide rod 38 is carried. By means of this construction the weight of the machine is carried on the tread frame through the springs 45, and as these springs are compressed the guide rod slides upwardly in the sleeve 37 to permit the movement of the arm 35 with respect to the tread frame, while maintaining the necessary relation of the tread frame with respect to the arm. The arm 35 is supported against the longitudinal thrust thereon by the rods or braces 52, which are connected to the outer end thereof and to the frame 10.

The tread frame does not coact directly with the flexible tread previously described, but the connection is effected through an intermediate roller chain 55, comprising a plurality of rollers 56, having their pivots 57 connected to each other by means of links 58 located at the opposite ends of the pivots, so that an endless chain is formed. Two of the roller chains 55 are provided for each caterpillar tread, and one of these roller chains is mounted on each of the tracks 42 carried by the tread frame 40, being maintained thereon by reason of the flanges 56ᵃ of the rollers 56, as shown in Fig. 5. These rollers coact with the flanges 19ᶜ of the tread sections 19, which flanges are enlarged along their inner edges and form substantially continuous tracks 23 for the rollers 56. As the flexible tread 18 is advanced over the traction wheels 13 and 24 the rollers 56 of the roller chains will coact with the under sides of the tracks 42 carried by the tread frame, and will at the same time roll upon the tracks 23, which are formed on the links of the flexible tread by the flanges 19ᶜ. The tread frame is so mounted as to maintain the intermediate portion of the flexible tread in a position considerably below the lower portions of the peripheries of the traction wheels, as shown in Fig. 1, so that the weight of the machine is supported by the portion of the flexible tread which coacts with the surface 21 of the ground, and independently of the traction wheels 13 and 24, whereby the rotation of these driving wheels is not affected by strains due to the weight of the tractor, and a smoother running and more efficient tread is provided. Owing to the construction of the tracks 42 of the tread frame, whereby the central portions thereof are hollowed out on the upper side as shown at 40ᶜ, the rollers 56 are suspended between the enlarged curved ends of the side frames 40ᵃ while passing through the upper portions of their travel, thereby reducing the friction and making it possible to mount the roller chains on the tracks in such a manner as to maintain them substantially tight at all times. The roller chains reduce to a minimum the friction between the flexible tread and the supporting mechanism by means of which the weight of the machine is carried. The tread frame is permitted to oscillate with respect to the guide rod 38 during the travel of the machine, and the springs 45 will permit the necessary upward movement of the tread frame, so that the invention is particularly adapted for use with heavy tractors, armored cars, and the like, which are intended for use in rough country. This method of mounting the tread frame permits the same to be maintained in the proper position with respect to the frame of the tractor, and where two tread frames are employed, as is usually the case, they are maintained parallel to each other without the use of any connection extending between them. At the same time they are permitted to oscillate freely and are maintained in their proper relative positions.

It will be observed that in the form of the invention illustrated in Fig. 1 the lower portion of the flexible tread has substantially a curved contour, due to the action of the tread frame in pressing downwardly on the intermediate part of the flexible tread. The portion of the tread in advance of that part which is in contact with the surface of the ground thus inclines upwardly and tends to pass readily over any obstructions which may be encountered. The general arrangement of the lower portion of the flexible tread may be caused to more nearly approximate the periphery of a large wheel by using a modified form of tread frame, as shown in Fig. 7. In this construction the tread frame 60 is substantially the same in construction as the tread frame 40, previously described, but the side frames thereof are so constructed that the peripheral tracks 61 are bowed downwardly on their lower sides, as shown at 62, so that the roller chains in contact therewith will impart to the flexible tread a general curved contour.

Although I have shown and described one form of the invention for the purposes of illustration, it will be understood that it may be constructed in various different forms without departing from the spirit of my invention as defined in the appended claims.

I claim:—

1. In a tractor, a frame, a flexible tread, means carried by said frame for supporting said tread, a tread frame connected to said first-named frame, resilient means interposed between said frames, and a movable chain of bearing elements mounted on said tread frame and coacting with said flexible tread.

2. In a tractor, a frame, traction wheels carried by said frame, a flexible tread mounted on said wheels, an arm attached to said frame between said wheels, a rod slidably mounted on said arm, a tread frame pivoted on said rod beneath said arm, and anti-friction means interposed between said tread frame and said flexible tread.

3. In a tractor, a frame, traction wheels carried by said frame, a flexible tread mounted on said wheels, an arm attached to said frame between said wheels, a rod slidably mounted on said arm, a tread frame pivoted on said rod beneath said arm, springs extending between said arm and tread frame, and an endless roller chain movably mounted on said tread frame and arranged to coact with said flexible tread.

4. In a tractor, a frame, traction wheels mounted on said frame, a flexible tread mounted on said wheels, an arm attached to said frame between said wheels, a tread frame resiliently suspended from said arm and engaging said tread for supporting said first-mentioned frame, and a rod pivotally attached to said tread frame and slidably engaging said arm.

5. The combination with the frame, traction wheels and flexible tread of a tractor, of an arm attached to said frame and projecting outwardly therefrom between said wheels, a tread frame mounted below said arm and engaging said flexible tread for supporting the tractor frame, resilient means interposed between said tread frame and said arm and means pivoted to said tread frame and engaging said arm in such wise as to permit of relative movements between said frame and arm.

6. The combination with the frame, traction wheels and flexible tread of a tractor, of an arm attached to said frame and projecting outwardly therefrom between said wheels, a tread frame resiliently mounted below said arm and engaging said flexible tread for supporting the tractor frame, and means for pivotally and slidably connecting said tread frame to said arm.

7. In a tractor, a frame, traction wheels mounted on said frame, a flexible tread mounted on said wheels, an arm attached to said frame between said wheels, a tread frame mounted below said arm and having a combination pivotal and slidable connection therewith, said tread frame engaging said flexible tread to prevent upward bending thereof, and a plurality of springs interposed between said arm and said tread frame for absorbing the upward thrusts encountered by the latter.

8. In a tractor, a frame, traction wheels mounted on said frame, a flexible tread mounted on said wheels, an arm attached to said frame between said wheels, a tread frame resiliently suspended from said arm, said tread frame being provided with a plurality of annular tracks, and movable chains of bearing elements mounted on said tracks and coacting with said flexible tread.

9. In a tractor, a frame, traction wheels mounted on said frame, a flexible tread mounted on said wheels, an arm attached to said frame between said wheels, a tread frame resiliently suspended from said arm, said tread frame being provided with a plurality of annular tracks, movable chains of bearing elements mounted on said tracks and coacting with said flexible tread, and flanges on said bearing elements adapted to overlie the sides of said tracks and said tread.

10. In a tractor, a frame, traction wheels mounted on said frame, a flexible tread mounted on said wheels, an arm attached to said frame between said wheels, a tread frame resiliently suspended from said arm, said tread frame being provided with a plurality of runners for engaging said tread and supporting said first-named frame, and means interposed between said runners for connecting said tread frame with said arm in such wise that the former may oscillate and move up and down relatively to the latter.

11. In a tractor, a frame, traction wheels mounted on said frame, a flexible tread mounted on said wheels, an arm attached to said frame between said wheels, a tread frame resiliently suspended from said arm, said tread frame being provided with a plurality of annular tracks, movable chains of bearing elements mounted on said tracks and coacting with said flexible tread, a substantially horizontally disposed pin carried by said tread frame and extending between said tracks, and a rod pivotally mounted on said pin and slidably engaging said arm.

12. In a tractor, a frame, traction wheels mounted on said frame, a flexible tread mounted on said wheels, a support attached to said frame and extending between said wheels, means interposed between said support and said tread for preventing the latter from bending upwardly, and means for pivotally and slidably connecting said last-named means to said support.

In testimony whereof, I have subscribed my name.

GEORGE LAWRENCE ERTZ.

Witnesses.
FRANKLIN I. BROWN,
PAUL CLERKE.